(12) United States Patent
Okuchi et al.

(10) Patent No.: US 6,572,248 B2
(45) Date of Patent: Jun. 3, 2003

(54) APPARATUS FOR AUTOMATICALLY ADJUSTING OPTICAL AXIS OF VEHICLE HEADLIGHTS

(75) Inventors: Hiroaki Okuchi, Farmington Hills, MI (US); Kunio Ohashi, Toyota (JP); Yuji Yamada, Okazaki (JP); Yoshiyuki Miki, Susono (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/964,871

(22) Filed: Sep. 28, 2001

(65) Prior Publication Data
US 2002/0039294 A1 Apr. 4, 2002

(30) Foreign Application Priority Data
Oct. 3, 2000 (JP) ........................................ 2000-303282

(51) Int. Cl.⁷ ............................................... F21V 21/29
(52) U.S. Cl. ........................ 362/464; 362/466; 362/467; 362/532
(58) Field of Search ................................. 362/464, 466, 362/467, 532

(56) References Cited

U.S. PATENT DOCUMENTS 5,645,338 A * 7/1997 Kobayashi ................... 362/276
2001/0040810 A1 * 11/2001 Kusagaya .................... 362/351

FOREIGN PATENT DOCUMENTS

| JP | A-6-197440 | 5/1985 |
| JP | A-10-151987 | 6/1998 |

* cited by examiner

*Primary Examiner*—Sandra O'Shea
*Assistant Examiner*—Guiyoung Lee
(74) *Attorney, Agent, or Firm*—Posz & Bethards, PLC

(57) ABSTRACT

In a vehicle headlight optical axis adjusting apparatus, inter-vehicle distance in each of divided zones is detected by a laser radar device. Desired optical axis raising angles for a vehicle headlight are calculated based on these inter-vehicle distances of the divided zones. The optical axis of the headlight is adjusted to the most downward pointing angle selected from among these angles, so that a driver of a preceding vehicle is not blinded.

7 Claims, 3 Drawing Sheets

APPARATUS FOR AUTOMATICALLY ADJUSTING OPTICAL AXIS OF VEHICLE HEADLIGHTS

CROSS REFERENCE TO RELATED APPLICATION

This application is based on and incorporates herein by reference Japanese Patent Application NO. 2000-303282 filed on Oct. 3, 2000.

BACKGROUND OF THE INVENTION

The present invention relates to an automatic vehicle headlight optical axis adjusting apparatus for automatically adjusting the optical axis of illumination from headlights provided in a vehicle.

It is proposed to ensure forward visibility of a vehicle by measuring distance to a preceding vehicle ahead thereof using a laser radar device and adjusting the optical axis of headlights up to the extent that the headlights do not blind a driver of a vehicle far ahead.

In one system disclosed in JP-A-10-151987, light distribution is changed so as to avoid directing the illumination light of the headlights to the detected preceding vehicle. However, in order to change part of the light distribution of the headlights the headlights and associated structure unavoidably become complicated and expensive. In addition, drivers of preceding vehicles to the right and left sides are blinded due to the light distribution characteristics of the headlights if the optical axis of the headlights is raised according to the distance to the vehicle that is directly ahead of the vehicle.

SUMMARY OF THE INVENTION

The present invention therefore has an object to provide an apparatus for automatically adjusting an optical axis of vehicle headlights so that forward visibility can be improved.

According to the present invention, distance to a forward or preceding vehicle in plural side-to-side zones of a specific angular range is detected as forward information for the vehicle. The desired optical axis raising angle for a vehicle headlight is calculated according to these inter-vehicle distances. The desired optical axis raising angle is the most downward pointing angle. It is therefore possible to control upward optical axis adjustment without complicating a system configuration and without blinding a driver of a preceding vehicle, and forward visibility can be improved by appropriately controlling adjustment of the optical axis of the headlight.

Preferably, a modular laser radar device is used to scan a specific angular range side to side for information in front of the vehicle, all preceding vehicles in the angular range can be detected.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
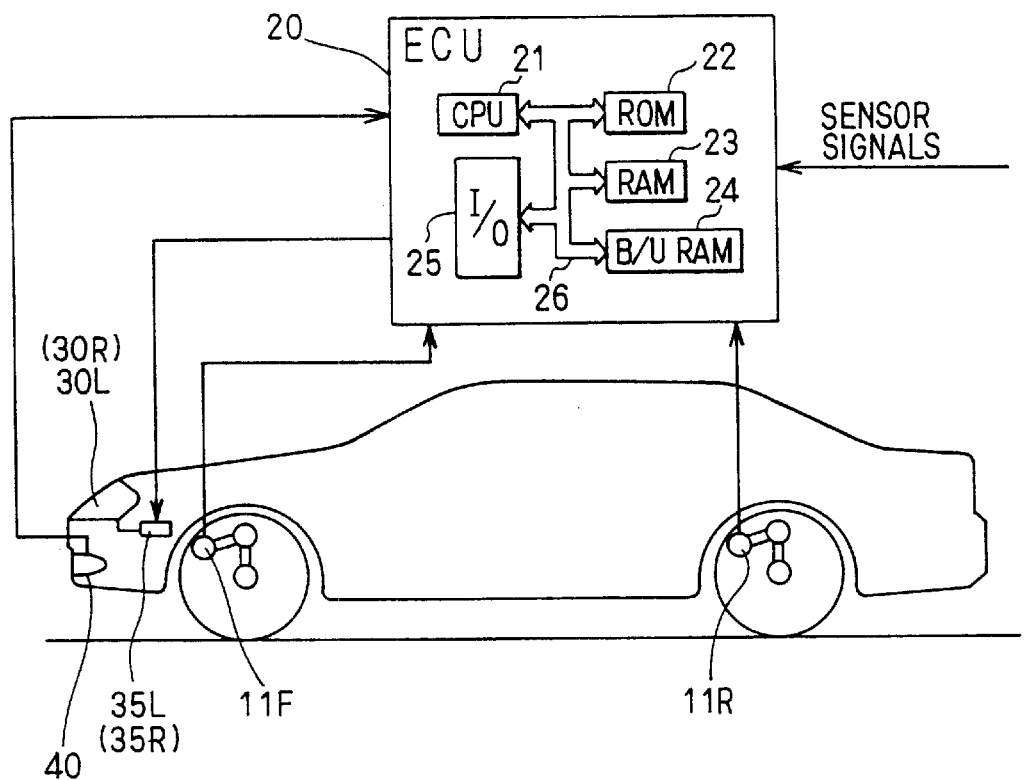
FIG. 1 is a schematic view showing an apparatus for automatically adjusting an optical axis of vehicle headlights according to a preferred embodiment of the present invention.

Referring to FIG. 1, a front wheel vehicle height sensor 11F and rear wheel vehicle height sensor 11R are mounted on the front and rear driver's side or passenger side axle of the vehicle, respectively. The relative displacement of the front wheel axle and the rear wheel axle to the chassis, that is, front vehicle height HF (vehicle height displacement at the front axle) and rear vehicle height HR (vehicle height displacement at the rear axle), are input from these vehicle height sensors 11F and 11R together with sensor signals from other types of sensors to an ECU (electronic control unit) 20 mounted in the vehicle. It is noted that the ECU 20 is shown outside the vehicle in the figure.

The ECU 20 is a logic operator comprising a CPU (central processing unit) 21 for executing various processes, ROM 22 for storing a control program and fixed control data, RAM 23 for storing data temporarily, backup RAM 24, input/output circuit 25, and a bus line 26 for connecting these components. The output signal from the ECU 20 is input to actuators 35L and 35R for the left and right headlights 30L and 30R to adjust the optical axis of the left and right headlights 30L and 30R. A laser radar device 40 for scanning a specific left and right angular width to detect all preceding vehicles within a specific range is mounted in the front bumper area of the vehicle, for example, to input distance to a vehicle detected by the laser radar device 40 to the ECU 20 as forward information for adjustably controlling the optical axis of the headlights 30L and 30R.

Figure 2:
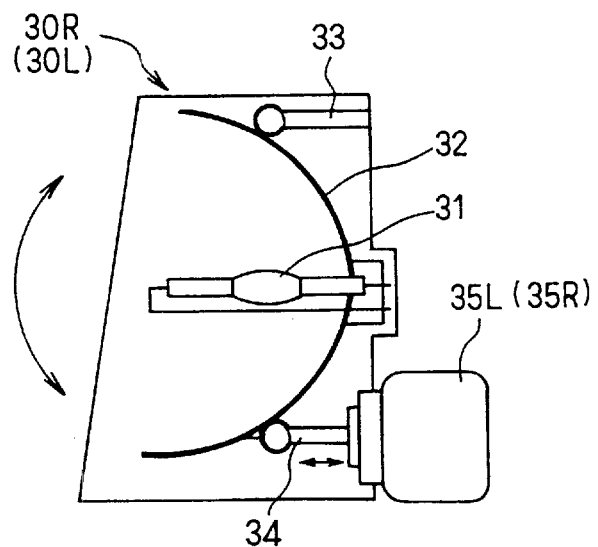
FIG. 2 is a section view showing a headlight shown in FIG. 1.

In FIG. 2, the headlight 30L (30R) comprises primarily a lamp 31 and a reflector 32 securing the lamp 31, a rod-like support 33 for supporting the reflector 32 movably so as to roll freely in an arc in the direction of the arrow, another rod-like moving part 34 that is freely movable while also supporting the reflector 32, and an actuator 35L (35R) such as a stepper motor or d.c. motor for driving the moving part 34 back and forth in the direction of the arrow. As a result, the reflector 32 pivots on the end of the support 33 when the moving part 34 is driven forward or backward by the actuator 35L (35R) and is tilted upward or downward by a desired optical axis angle (desired optical axis adjustment angle) Ga to adjust the optical axis of the headlight 30L (30R). It should be noted that the optical axis of the headlight 30L (30R) is initially set assuming that a driver is onboard the vehicle.

The front-rear pitch angle θp of the vehicle is calculated using the following equation (1) as inclination to a predefined reference surface in the front-rear direction of the vehicle based on the front vehicle height HF and rear vehicle height HR input from the vehicle height sensors 11F, 11R. Here, Lw is a wheel base (distance between the axles) of front and rear wheels of the vehicle.

$$\theta p = \tan^{-1}\{(HF-HR)/Lw\} \quad (1)$$

The desired optical axis angle θa is then calculated with respect to this pitch angle θp so that θa =−θp and does not blind a driver of an on-coming vehicle. It will be noted that the desired optical axis angle θa for normal control of the headlight 30L (30R) is maintained at a downward 1[%] (=−0.57[deg]) angle so that drivers of preceding vehicles are not blinded and forward visibility can be ensured for the driver of the vehicle having a vehicle headlight optical axis adjusting apparatus of the present invention.

The process executed by the CPU 21 of the ECU 20 for controlling raising the optical axis of the headlights 30L and 30R is described next below based on the flow chart shown in FIG. 3. This control routine is repeated by the CPU 21 at specific time intervals.

Figure 3:
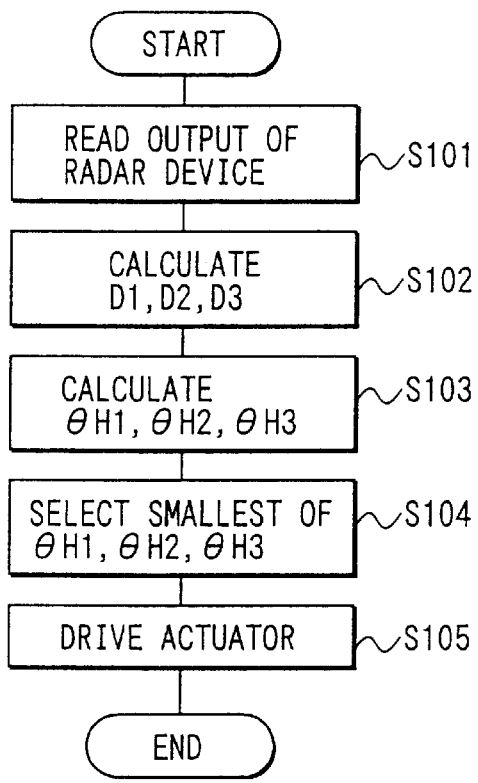
FIG. 3 is a flow chart showing a process for controlling raising the optical axis executed by an electronic control unit (ECU) shown in FIG. 1.
Figure 4:
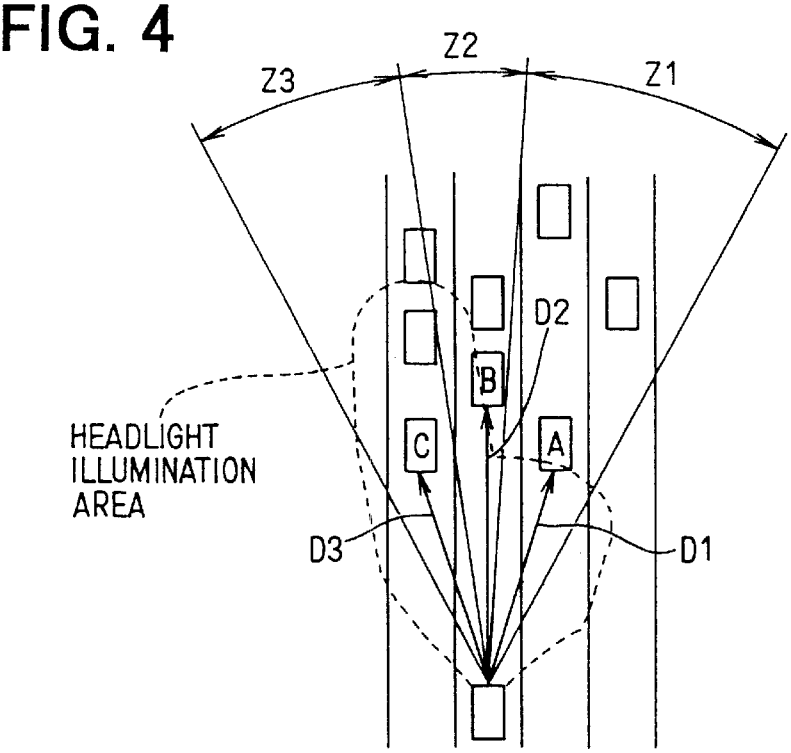
FIG. 4 is a diagrammatic view showing the headlight illumination area and inter-vehicle distance to a preceding vehicle in each zone.

Referring to FIG. 3, the output signal from the laser radar device 40 is read first at step S101 as forward information for the vehicle. Inter-vehicle distance D1, D2, and D3 is then calculated at the next step S102 for each zone Z1, Z2, Z3 preset for the vehicle as shown in FIG. 4 based on the output signal from the laser radar device 40 read at step S101. It is noted that, as shown by the dotted line in FIG. 4, the illumination area resulting from the light distribution characteristics of the headlights 30L and 30R does not cause on-coming vehicles at a distance on the right side to be illuminated, but does illuminate vehicles at a distance directly ahead and on the left side. This means that the angle allowed for adjusting the optical axis of the headlights 30L, 30R upward varies according to where the forward vehicle is located even when the distance to the forward vehicle is the same.

Figure 5A:
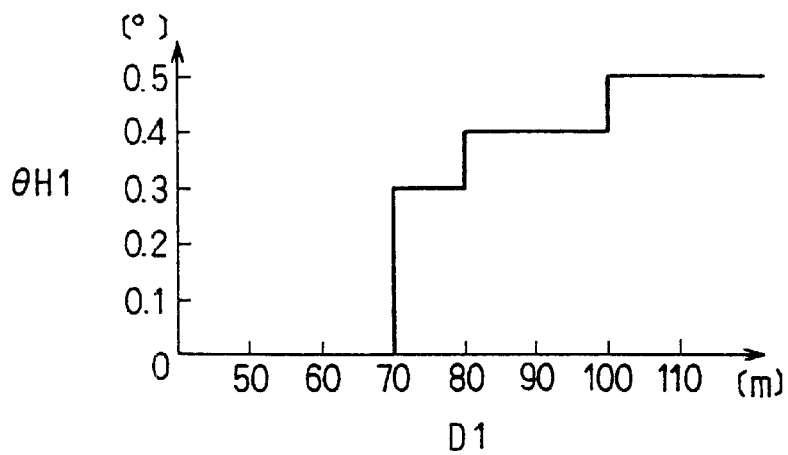
FIGS. 5A to 5C are graphs showing desired optical axis raising angles in relations to inter-vehicle distances in each zone in FIG. 3.
Figure 5B:
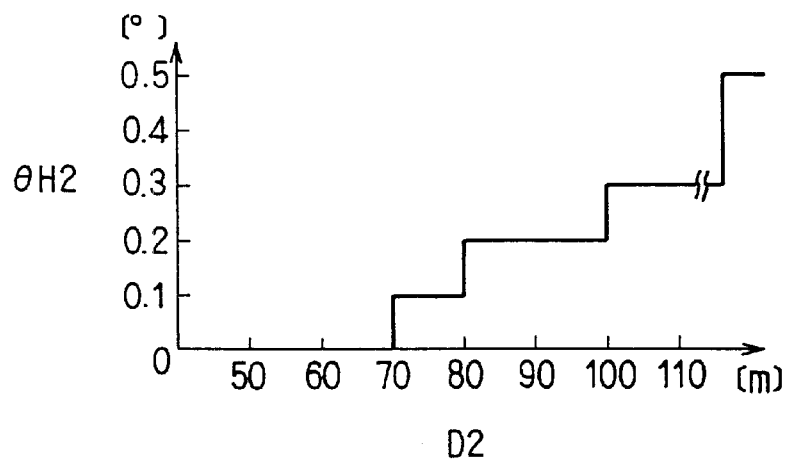
Figure 5C:
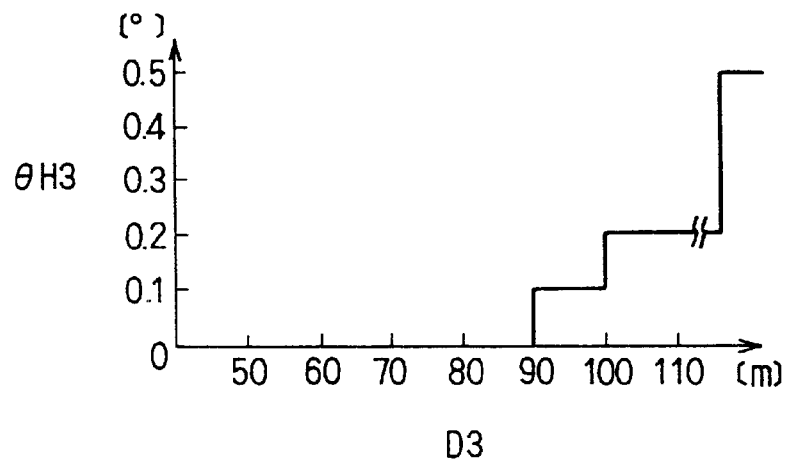

Next, at step S103, desired optical axis raising angle θH1, θH2, θH3 is calculated from the maps shown in FIGS. 5A to 5C according to the inter-vehicle distances D1, D2, and D3 determined at step S102. More specifically, desired optical axis raising angle θH1[deg] for inter-vehicle distance D1[m] in zone Z1 is determined from the map of FIG. 5A, desired optical axis raising angle θH2[deg] for inter-vehicle distance D2[m] in zone Z2 is determined from the map of FIG. 5B, and desired optical axis raising angle θH3[deg] for inter-vehicle distance D3[m] in zone Z3 is determined from the map of FIG. 5C.

It is assumed that the inter-vehicle distance D1 to vehicle A in zone Zi in FIG. 4 id 90[m], inter-vehicle distance D2 to vehicle B in zone Z2 is 110[m], and inter-vehicle distance D3 to vehicle C in zone Z3 is 80[m]. In this case, desired optical axis raising angle θH1 for inter-vehicle distance D1=90[m] to vehicle A in zone Z1 is determined to be 0.4[deg] from the map data of FIG. 5A, desired optical axis raising angle θH2 for inter-vehicle distance D2=110[m] to vehicle B in zone Z2 is determined to be 0.3[deg] from the map data of FIG. 5B, and desired optical axis raising angle θH3 for inter-vehicle distance D3=80[m] to vehicle C in zone Z3 is determined to be 0[deg] from the map data of FIG. 5C. This map data is stored in ROM 22 of ECU 20.

Moving next to step S104, the smallest of the desired optical axis raising angles θH1, θH2, θH3 calculated at step S103 is selected. In the above example 0[deg] is selected as the smallest desired optical axis raising angle. This is because in this case it is necessary to give more consideration to blinding a driver of vehicle C on the left side in zone Z3 than vehicle B directly ahead in zone Z2, and the optical axis is therefore not raised.

If in this example there is no vehicle C or other vehicle on the left side in zone Z3 ahead of vehicle B directly ahead in zone Z2, the desired optical axis raising angle θH3 for the inter-vehicle distance D3=∞[m] in zone Z3 determined by the map data search at step S103 is 0.5[deg]. As a result, 0.3[deg] will be selected as the smallest of the desired optical axis raising angles θH1, θH2, θH3. This is because in this case vehicle A on the right side in zone Z1 is closer than vehicle B directly ahead in zone Z2, but forward visibility can be improved by controlling the optical axis upward considering the illumination range of the headlights 30L, 30R. Finally at step S105, the actuator 35L, 35R is driven according to the smallest desired optical axis raising angle selected at step S104, thereby controlling the optical axis of the headlight 30L, 30R.

It is noted that, if the distance to the preceding vehicles is not divided into zones position information would be needed for all preceding vehicles. Because position information for preceding vehicles can be obtained by communication with an adaptive cruise control ECU (not shown) of the laser radar device 40, it would be necessary to communicate 20 bytes if, for example, there are ten preceding vehicles. Further, 1 byte is needed for the right to left distance, and 1 byte is needed for the distance ahead. This increases the communication load. By dividing the position information for preceding vehicles into zones as in the above embodiment and outputting the inter-vehicle distances D1, D2, D3 in sequence, however, the information communicated from the adaptive cruise control ECU that is needed to control raising the optical axis is only 3 bytes (=1 byte×3).

According to the above embodiment, the inter-vehicle distance D1, D2, D3 to the vehicle A, B, C ahead in each of three zones Z1, Z2, Z3 dividing the area ahead of the vehicle side to side into predetermined zones of a specific angular range is detected by the laser radar device 40 to obtain the forward information for the vehicle. The desired optical axis raising angle θH1, θH2, θH3 for the vehicle headlight 30L, 30R is calculated according to these inter-vehicle distances D1, D2, D3. The optical axis of the headlight 30L, 30R is adjusted to the most downward pointing angle selected from among these desired optical axis raising angles θH1, θH2, θH3.

It is therefore possible to control optical axis adjustment without complicating the system configuration and without blinding a driver of a preceding vehicle, and forward visibility can be improved by appropriately controlling adjustment of the optical axis of the headlight 30L, 30R upward from the desired optical axis angle Oa used during normal control.

It will be noted that in place of the laser radar device 40 a millimeter wave radar device or CCD camera and image data processing system may be used to detect the forward information for the vehicle and control raising the optical axis of the headlight 30L, 30R.

It will be noted also that in place of dividing the area ahead of the vehicle into three zones, a minimum of two zones can be used assuming that the illumination ranges resulting the light distribution characteristics are different on right and left.

Furthermore, the desired optical axis raising angles need not be set in steps as shown in FIGS. 5A to 5C, but may be determined linearly or non-linearly. Furthermore, the desired optical axis raising angle may be set to decrease as the zone gets closer to the right because the preceding embodiment assumes driving on the left side.

The present invention should not be limited to the above embodiment and modifications, but may be implemented in many other ways without departing from the spirit of the invention.

What is claimed is:

1. An apparatus for automatically adjusting an optical axis of a vehicle headlight comprising:

a forward information detecting means for detecting forward information of the vehicle, wherein the forward information of the vehicle includes a plurality of inter-vehicle distances to forward vehicles in a plurality of zones of a specific angular range defined in a lateral direction, respectively;

a desired angle calculating means for calculating desired optical axis raising angles for the vehicle headlight based on the inter-vehicle distances detected by the forward information detecting means, respectively; and an optical axis adjusting means for adjusting the optical axis of the vehicle headlight based on one of the desired optical axis raising angles calculated by the desired angle calculating means that is most downward pointing.

2. An apparatus for automatically adjusting an optical axis of a vehicle headlight as in claim 1, wherein the forward information detecting means includes a radar device.

3. An apparatus for automatically adjusting an optical axis of a vehicle headlight as in claim 1, wherein the desired angle calculating means calculates the desired optical axis raising angles in different predetermined distance-angle characteristics, respectively.

4. A method for automatically adjusting an optical axis of a vehicle headlight comprising:

detecting a distance to a forward vehicle in each of a plurality of predetermined zones defined in a left-right direction of the vehicle;

calculating, for each of the predetermined zones, a desired optical axis angle for the vehicle headlight based on the inter-vehicle distance;

selecting one optical axis angle from a plurality of desired optical axis angles calculated during the calculating, for each of the predetermined zones, of a desired optical axis angle for the vehicle headlight based on the inter-vehicle distance; and adjusting the optical axis of the vehicle headlight in correspondence with an optical axis angle selected by the selecting of one optical axis angle from a plurality of desired optical axis angles.

5. The method of claim 4, wherein the calculating, for each of the predetermined zones, of a desired optical axis angle for the vehicle headlight based on the inter-vehicle distance comprises calculating the desired optical axis angle by using a predetermined distance-angle characteristic which is different from zone to zone.

6. The method of claim 4, wherein the selecting of one optical axis angle from a plurality of desired optical axis angles comprises selecting an optical axis angle that is most downward pointing.

7. A vehicle headlight optical axis adjustment apparatus, comprising:

a radar device for detecting respective distances to preceding vehicles;

an electronic control unit in communication with the radar device for calculating respective optical axis angles for a vehicle headlight based on the respective distances to preceding vehicles and further for selecting one of the respective optical axis angles for a vehicle headlight; and an actuator in communication with the electronic control unit for controlling an optical axis of a vehicle headlight based on the one of the respective optical axis angles selected by the electronic control unit.

* * * * *